United States Patent
Hong

(10) Patent No.: US 10,953,545 B2
(45) Date of Patent: Mar. 23, 2021

(54) SYSTEM AND METHOD FOR AUTONOMOUS NAVIGATION USING VISUAL SPARSE MAP

(71) Applicants: Beijing Jingdong Shangke Information Technology Co., Ltd., Beijing (CN); JD.com American Technologies Corporation, Mountain View, CA (US)

(72) Inventor: Soonhac Hong, San Jose, CA (US)

(73) Assignees: Beijing Jingdong Shangke Information Technology Co., Ltd., Beijing (CN); JD.com American Technologies Corporation, Mountain View, CA (US)

(*) Notice: Subject to any disclaimer, the term of this patent is extended or adjusted under 35 U.S.C. 154(b) by 211 days.

(21) Appl. No.: 16/102,632

(22) Filed: Aug. 13, 2018

(65) Prior Publication Data

US 2020/0047340 A1 Feb. 13, 2020

(51) Int. Cl.
*B25J 9/16* (2006.01)
*G05D 1/02* (2020.01)
(Continued)

(52) U.S. Cl.
CPC ........... *B25J 9/1666* (2013.01); *B25J 9/1697* (2013.01); *G05B 15/02* (2013.01)

(58) Field of Classification Search
CPC ....... B25J 9/1666; B25J 9/1697; G05B 15/02; G01S 17/894; G01S 17/931;
(Continued)

(56) References Cited

U.S. PATENT DOCUMENTS 10,203,209 B2 * 2/2019 Roumeliotis .......... G01C 21/32
2014/0333741 A1 * 11/2014 Roumeliotis ........ G01C 21/165
348/61
(Continued)

OTHER PUBLICATIONS

Ling et al, Building Maps for Autonomous Navigation Using Sparse Visual SLAM Features, 2017, IEEE, RSJ International Conference on Intelligent Robots and Systems (IROS) Sep. 24-28, 2017, Vancouver, BC, Canada, pp. 1374-1381 (Year: 2017).*
(Continued)

*Primary Examiner* — Jaime Figueroa
(74) *Attorney, Agent, or Firm* — China Science Patent & Trademark US LLC; Shanyun Lu

(57) ABSTRACT

A system and method for autonomous navigation using a visual sparse map. The system includes a robotic device having an RGB-D camera, a processor and a storage device storing computer executable code. The computer executable code is configured to: obtain the visual sparse map based on captured RGB-D images; capture an RGB image; acquire a current pose of the robotic device; find a keyframes nearest to the current pose of the robotic device; find a target waypoint that is ahead of the nearest keyframe at about a pre-defined distance; compute transition velocity and rotation velocity of the robotic device based on relative location between the robotic device and the target waypoint; and control operation of the robotic device using the computed transition velocity and rotation velocity to achieve autonomous navigation.

19 Claims, 11 Drawing Sheets

(51) Int. Cl.
*G01C 21/20* (2006.01)
*G05B 15/02* (2006.01)

(58) Field of Classification Search
CPC .... G01C 21/206; G01C 21/00; G05D 1/0274; G05D 1/0248; G05D 1/00; G05D 1/0251; G05D 1/0225; G05D 1/0221; G05D 1/028; G05D 1/0276; G05D 2201/0211
USPC .................................................. 700/245, 255
See application file for complete search history.

(56) References Cited

U.S. PATENT DOCUMENTS

2017/0343356 A1* 11/2017 Roumeliotis .......... G01C 21/32
2019/0026943 A1* 1/2019 Yan .......................... G06T 7/70

OTHER PUBLICATIONS

Leutenegger et al, Keyframe-based visual-inertial odometry using nonlinear optimization, 2015, SAGE, The International Journal of Robotics Research, vol. 34(3), pp. 314-334 (Year: 2015).*
R. Siegwart, I.R. Nourbakhsh, D. Scaramuzza, Introduction to Autonomous Mobile Robots, Second edition, The MIT Press, 2011.
J.C. Latombe, Robot Motion Planning, Kluwer Academic Publishers, 1991.
A. Lazanas, J.C. Latombe, Landmark Robot Navigation, Proceedings of the Tenth National Conference on AI, 1992.
E. Marder-Eppstein, E. Berger, T. Foote, B. Gerkey, and K. Konolige, The office marathon: Robust navigation in an indoor office environment, Proc. IEEE International Conference on Robotics and Automation (ICRA), 2010, pp. 300-307.
K. Konolige, M. Agrawal, R. C. Bolles, C. Cowan, M. Fischler, and B. Gerkey, Outdoor mapping and navigation using stereo vision, Exp. Robot., 2008, pp. 179-190.
F. Dayoub, T. Morris, B. Upcroft, P. Corke, "Vision-only autonomous navigation using topometric maps," Intelligent Robots and Systems (IROS), 2013 IEEE/RSJ International Conference on, 2013, pp. 1923-1929.
J. Engel, T. Schps, D. Cremers, LSD-SLAM: Large-Scale Direct Monocular SLAM, European Conference on Computer Vision (ECCV), 2014.
J. Engel, J. Sturm, D. Cremers, Semi-Dense Visual Odometry for a Monocular Camera, IEEE International Conference on Computer Vision (ICCV), 2013.
S. Hong, 6-DOF Pose Estimation for a Portable Navigation Device, PhD dissertation, University of Arkansas at Little Rock, 2014.
R.F. Salas-Moreno, R.A. Newcombe, H. Strasdat, P.H.J. Kelly, A.J. Davison, SLAM++: Simultaneous Localisation and Mapping at the Level of Objects, IEEE Conference on Computer Vision and Pattern Recognition (CVPR), 2013, pp. 1352-1359.
R.F. Salas-Moreno, B. Glocken, P.H.J. Kelly, A.J. Davison, Dense planar SLAM, IEEE International Symposium on Mixed and Augmented Reality (IS-MAR), 2014, pp. 157-164.
P. Henry, M. Krainin, E. Herbst, X. Ren, and D. Fox, RGB-D mapping Using Kinect-style depth cameras for dense 3D modeling of indoor environments, International Journal of Robotics Research, 2012, vol. 31, No. 5, pp. 647-663.
A.S. Huang, A. Bachrach, P. Henry, M. Krainin, D. Mat-Urana, D. Fox, N. Roy, Visual odometry and mapping for autonomous flight using an RGB-D camera, International Symposium on Robotics Research (ISRR), 2011, pp. 1-16.
R.A. Newcombe, S. Izadi, O. Hilliges, D. Molyneaux, D. Kim, A.J. Davison, P. Kohi, J. Shotton, S. Hodges, A. Fitzgibbon, KinectFusion: Real-time dense surface mapping and tracking, IEEE International Symposium on Mixed and Augmented Reality (ISMAR), 2011, pp. 127-136.
V. Pradeep, C. Rhemann, S. Izadi, C. Zach, M. Bleyer, S. Bathiche, MonoFusion: Real-time 3D reconstruction of small scenes with a single web camera, 2013 IEEE International Symposium on Mixed and Augmented Reality (ISMAR), 2013, pp. 83-88.
A. J. Davison, I. D. Reid, N. D. Molton, and O. Stasse, MonoSLAM: Real-time single camera SLAM, IEEE Transactions on Pattern Analysis and Machine Intelligence, 2007, vol. 29, No. 6, pp. 1052-1067.
R. Mur-Artal, J. M. M. Montiel, and J. D. Tardos, ORB-SLAM: a Versatile and Accurate Monocular SLAM system, IEEE Trans. Robot., 2015, pp. 1147-1163.
H. Lim, J. Lim, and H. J. Kim, Real-time 6-DOF monocular visual SLAM in a large-scale environment, 2014 IEEE Inter-national Conference on Robotics and Automation (ICRA), 2014, pp. 1532-1539.
J. Lim, J.-M. Frahm, and M. Pollefeys, Online environment mapping, CVPR 2011, 2011, pp. 3489-3496.
H. Badino, D. Huber, and T. Kanade, Real-time topometric localization, IEEE Int. Conf. Robot. Autom., No. ICRA, 2012, pp. 1635-1642.
C. X. Guo, K. Sartipi, R. C. Dutoit, G. Georgiou, R. Li, J. O. Leary, E. D. Nerurkar, J. A. Hesch, and S. I. Roumeliotis, Large-Scale Cooperative 3D Visual-Inertial Mapping in a Manhattan World, Technical Report, University of Minnesota, Dept. of Comp. Sci. and Eng., MARS Lab, 2015.
R. Mur-Artal, & J. D. Tardos, ORB-SLAM2: an Open-Source SLAM System for Monocular, Stereo, and RGB-D Cameras, IEEE Transactions on Robotics, 2017.
Robotis turtlebot2, http://www.turtlebot.com/turtlebot2/.
Orbbec Astra Pro, https://orbbec3d.com/product-astra-pro/.
Clearpath Husky, https://www.clearpathrobotics.com/huskyunmanned-ground-vehicle-robot/.
Logitech C920 Pro, https://www.logitech.com/en-us/product/hd-prowebcam-c920.
Robot Operating System (ROS), http://www.ros.org/.
Vicon motion capture system, https://www.vicon.com/.

* cited by examiner

600

700

SYSTEM AND METHOD FOR AUTONOMOUS NAVIGATION USING VISUAL SPARSE MAP

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to the field of autonomous navigation, and more particularly to systems and methods for autonomous navigation using visual sparse map.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Autonomous navigation is an essential component for a robot to reach a goal location. For autonomous navigation, dense maps have been introduced. However, there are a couple of challenges of dense map based autonomous navigation. First, most points of a dense map are redundant for localization and navigation. Second, the dense map needs to be updated periodically if environment changes. Thus, high-cost map management and computation follows. Third, a huge memory is necessary to store the dense map as the map size increases.

Therefore, an unaddressed need exists in the art to address the aforementioned deficiencies and inadequacies.

SUMMARY

In certain aspects, the present disclosure relates to a system for autonomous navigation using a visual sparse map. In certain embodiments, the system includes a robotic device, and the robotic device has a visual sensor, a processor and a storage device storing computer executable code. The computer executable code, when executed at the processor, is configured to:

obtain the visual sparse map, the visual sparse map comprising a plurality of visual feature points and a plurality of keyframes;

capture an image using the visual sensor;

acquire a current pose of the robotic device based on the image and the visual sparse map;

find a nearest keyframe, where the nearest keyframe is one of the plurality of keyframes that is nearest to the current pose of the robotic device;

find a target waypoint, where the target waypoint is one of the plurality of keyframes that is ahead of the nearest keyframe and has a pre-defined distance to the nearest keyframe (or is around or closest to the pre-determined distance from the nearest keyframe);

compute transition velocity and rotation velocity of the robotic device based on relative location between the robotic device and the target waypoint; and control operation of the robotic device using the computed transition velocity and rotation velocity to achieve autonomous navigation.

In certain embodiments, the visual sensor is a Red-Green-Blue depth (RGB-D) camera, the visual sparse map is obtained using RGB-D images collected by the RGB-D camera, and the captured image is an RGB image.

In certain embodiments, the pre-defined distance is in a range of 2 centimeter (cm)-800 cm. In certain embodiments, the pre-defined distance is in a range of 20 cm-80 cm. In certain embodiments, the pre-defined distance is in a range of 30 cm-50 cm. In certain embodiments, the pre-defined distance is about 40 cm. In certain embodiments, the pre-determined distance can be changed according to the reference line and the speed of the robot.

In certain embodiments, the computer executable code is configured to compute the transition velocity and the rotation velocity based on a transition difference and an angular difference between the current pose of the robotic device and the target waypoint, and the transition difference $t_D$ and the angular difference $\theta_D$ are calculated by:

$$t_D = \|t_T - t_R\|, \text{ and}$$

$$\theta_D = |\theta_T - \theta_R|,$$

where $t_T$ is a location of the target waypoint in the visual sparse map, $t_R$ is a location of the robotic device in the visual sparse map, and $t_D$ is the transition difference between the location of the robotic device and the location of the target waypoint; and $\theta_T$ is an orientation of the target waypoint in 2D space of the visual sparse map, $\theta_R$ is an orientation of the robotic device in the 2D space of the visual sparse map, and $\theta_D$ is the angular difference between the orientation of the robotic device and the orientation of the target waypoint.

In certain embodiments, the computer executable code is configured to compute the transition velocity $V_T$ and the rotation velocity $V_\theta$ by:

$$V_T = \begin{cases} V_m & \text{if } \theta_D \leq \theta_h \\ \dfrac{V_m}{2} & \text{if } \theta_D > \theta_h \end{cases}, \text{ and}$$

$$V_\theta = \frac{\theta_D}{\alpha},$$

where $V_m$ is a desired maximum translation speed of the robotic device, $\theta_h$ is a threshold of angular difference for reducing $V_T$, and $\alpha$ is an empirical coefficient.

In certain embodiments, $\theta_h$ is in a range of 30 degree-80 degrees. In certain embodiments, $\theta_h$ is in a range of 45 degrees-65 degrees. In certain embodiments, $\theta_h$ is in a range of 55 degrees-60 degrees. In certain embodiments, $\theta_h$ is about 57 degrees. In certain embodiments, $\alpha$ is in a range of 0.5-50. In certain embodiments, $\alpha$ is in a range of 2-20. In certain embodiments, $\alpha$ is in a range of 3-12. In certain embodiments, $\alpha$ is about 6. In certain embodiments, $\theta_h$ and $\alpha$ can be changed according to the reference line and the speed of the robot.

In certain embodiments, the plurality of keyframes are listed as $\{x_0, x_1, \ldots, x_{k-1}, x_k\}$, $x_k$ is defined by three dimensional coordinates of the $k^{th}$ keyframe, k is an index of $x_k$, and the target waypoint has an index greater than an index of the nearest keyframe. In certain embodiments, the keyframes are listed along the driving direction of the robotic device, and the keyframes listed later in the list are ahead of the keyframes listed earlier in the list. That is, keyframe $x_k$ is ahead of $x_{k-1}$, ..., and keyframe $x_1$ is ahead of keyframe $x_0$.

In certain embodiments, the visual sensor is an RGB-D camera, the visual sparse map is obtained based on collected RGB-D images by the visual sensor, and the image captured is an RGB image.

In certain embodiments, the computer executable code is configured to obtain the visual sparse map by: collecting each of the RGB-D images; extracting feature points from each of the RGB-D images; and for each of the RGB-D image:

predicting a relative pose between the current image and a local map based on the extracted feature points and feature points in the local map;

determining if the current image is a new keyframe by comparing extracted feature points with feature points in a last keyframe;

optimizing the local map using the new keyframe;

determining loop closure based on the new keyframe; and storing the extracted feature points and the new keyframe to obtain the visual sparse map.

In certain embodiments, the obtaining of the visual sparse map may also be performed using RGB images instead of RGB-D images.

In certain embodiments, the step of predicting a relative pose is performed using at least one of motion model, visual odometry, and relocalization.

In certain embodiments, the current image is determined to be the new keyframe if a number of matched points between the current image and the last keyframe is smaller than a threshold. In certain embodiments, the threshold of the matched points is about 2%-40%. In certain embodiments, the threshold of the matched points is about 5%-20%. In certain embodiments, the threshold of the matched points is about 10%, which means the new keyframe may include about 90% of new map points. In certain embodiments, the threshold of the matched points can be changed according to the visual feature sparseness of the environment.

In certain embodiments, the computer executable code is configured to delete an old keyframe when the keyframe is redundant, so as to maintain a compact local map. In certain embodiments, if a keyframe has about 90% of the map points which has been seen in at least other three keyframes, the keyframe is determined as a redundant keyframe and deleted in the local map.

In certain embodiments, the step of determining loop closure uses a place recognition database consisting of a visual vocabulary.

In certain aspects, the present disclosure relates to a method for autonomous navigation using a visual sparse map. In certain embodiments, the method includes:

obtaining the visual sparse map, the visual sparse map comprising a plurality of visual feature points and a plurality of keyframes;

capturing an image using the visual sensor;

acquiring, by a processor of the robotic device, a current pose of the robotic device based on the image and the visual sparse map;

finding, by the processor, a nearest keyframe, where the nearest keyframe is one of the plurality of keyframes that is nearest to the current pose of the robotic device;

finding, by the processor, a target waypoint, where the target waypoint is one of the plurality of keyframes that is ahead of the nearest keyframe and has a pre-determined distance to the nearest keyframe (or is around or closest to the pre-defined distance from the nearest keyframe);

computing, by the processor, transition velocity and rotation velocity of the robotic device based on relative location between the robotic device and the target waypoint; and controlling, by the processor, operation of the robotic device using the computed transition velocity and rotation velocity to achieve autonomous navigation.

In certain embodiments, the visual sensor is an RGB-D camera, the visual sparse map is obtained using RGB-D images collected by the RGB-D camera, and the captured image is an RGB image.

In certain embodiments, the pre-defined distance is in a range of 2 cm-800 cm. In certain embodiments, the pre-defined distance is in a range of 20 cm-80 cm. In certain embodiments, the pre-defined distance is in a range of 30 cm-50 cm. In certain embodiments, the pre-defined distance is about 40 cm.

In certain embodiments, the step of computing the transition velocity and the rotation velocity is performed based on a transition difference and an angular difference between the current pose of the robotic device and the target waypoint, and the transition difference $t_D$ and the angular difference $\theta_D$ are calculated by:

$$t_D = \|t_T - t_R\|, \text{ and}$$

$$\theta_D = |\theta_T - \theta_R|,$$

where $t_T$ is a location of the target waypoint in the visual sparse map, $t_R$ is a location of the robotic device in the visual sparse map, and $t_D$ is the transition difference between the location of the robotic device and the location of the target waypoint; and where $\theta_T$ is an orientation of the target waypoint in 2D space of the visual sparse map, $\theta_R$ is an orientation of the robotic device in the 2D space of the visual sparse map, and $\theta_D$ is the angular difference between the orientation of the robotic device and the orientation of the target waypoint.

In certain embodiments, the transition velocity $V_T$ and the rotation velocity $V_\theta$ are computed by:

$$V_T = \begin{cases} V_m & \text{if } \theta_D \leq \theta_h \\ \dfrac{V_m}{2} & \text{if } \theta_D > \theta_h \end{cases}, \text{ and}$$

$$V_\theta = \frac{\theta_D}{\alpha},$$

where $V_m$ is a desired maximum translation speed of the robotic device, $\theta_h$ is a threshold of angular difference for reducing $V_T$, and $\alpha$ is an empirical coefficient.

In certain embodiments, $\theta_h$ is in a range of 30 degrees to 80 degrees. In certain embodiments, $\theta_h$ is in a range of 45 degrees-65 degrees. In certain embodiments, $\theta_h$ is in a range of 55 degrees-60 degrees. In certain embodiments, $\theta_h$ is about 57 degrees. In certain embodiments, $\alpha$ is in a range of 0.5-50. In certain embodiments, $\alpha$ is in a range of 2-20. In certain embodiments, $\alpha$ is in a range of 3-12. In certain embodiments, $\alpha$ is about 6.

In certain aspects, the present disclosure relates to a non-transitory computer readable medium storing computer executable code. In certain embodiments, the computer executable code, when executed at a processor of a robotic device, is configured to perform the method described above.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
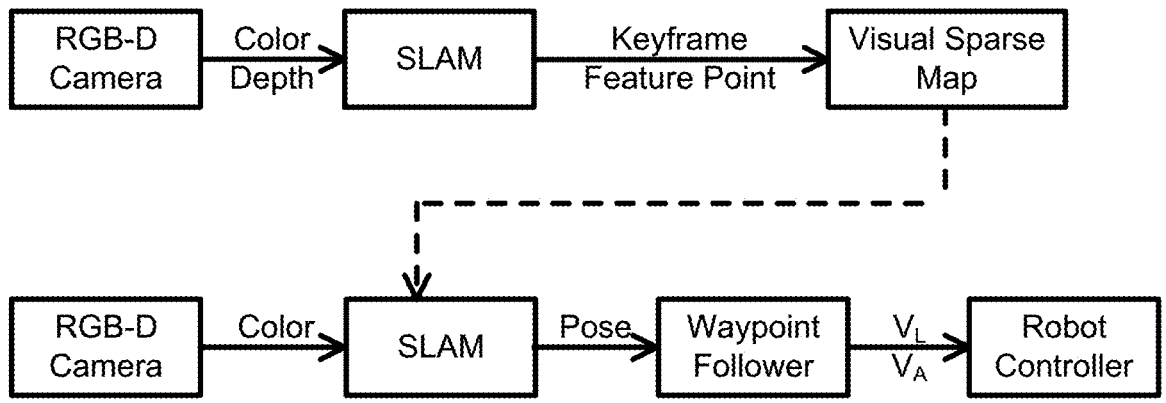
FIG. 1 schematically depicts a system for autonomous navigation using visual sparse map according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control. As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module or unit may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

OVERVIEW OF THE DISCLOSURE

A couple of maps have been introduced for autonomous navigation. Of them, metric map is one of the popular maps for autonomous navigation. In a metric map, positions of landmarks or objects in an environment are stored in a map with respect to a global coordinate system. Metric map can be classified as continuous map and discrete map. The former represents the environment using lines or polygons, and the latter represents the environment using cells, points, Surfel, Voxel, and features. Discrete map can be classified as dense map and sparse map according to map density. Cells, points, Surfel and Voxel have been used for dense map and features have been used for sparse map.

Occupancy grid map is a typical map using cells for autonomous navigation. Each cell of an occupancy grid map represents whether a space is occupied by objects or not. A path for navigation is planned on the occupancy grid map. However, the occupancy grid map typically represents the environment in 2D space.

For 3D space, a dense point cloud map has been used. As the map area grows, points in the dense point cloud map increase substantially. The size of point cloud map may be reduced by Surfel and Voxel. However, Surfel and Voxel still require high computational cost for post-processing to generate Surfel and Voxel. In addition, the most information of the dense map is redundant for autonomous navigation.

Figure 2:
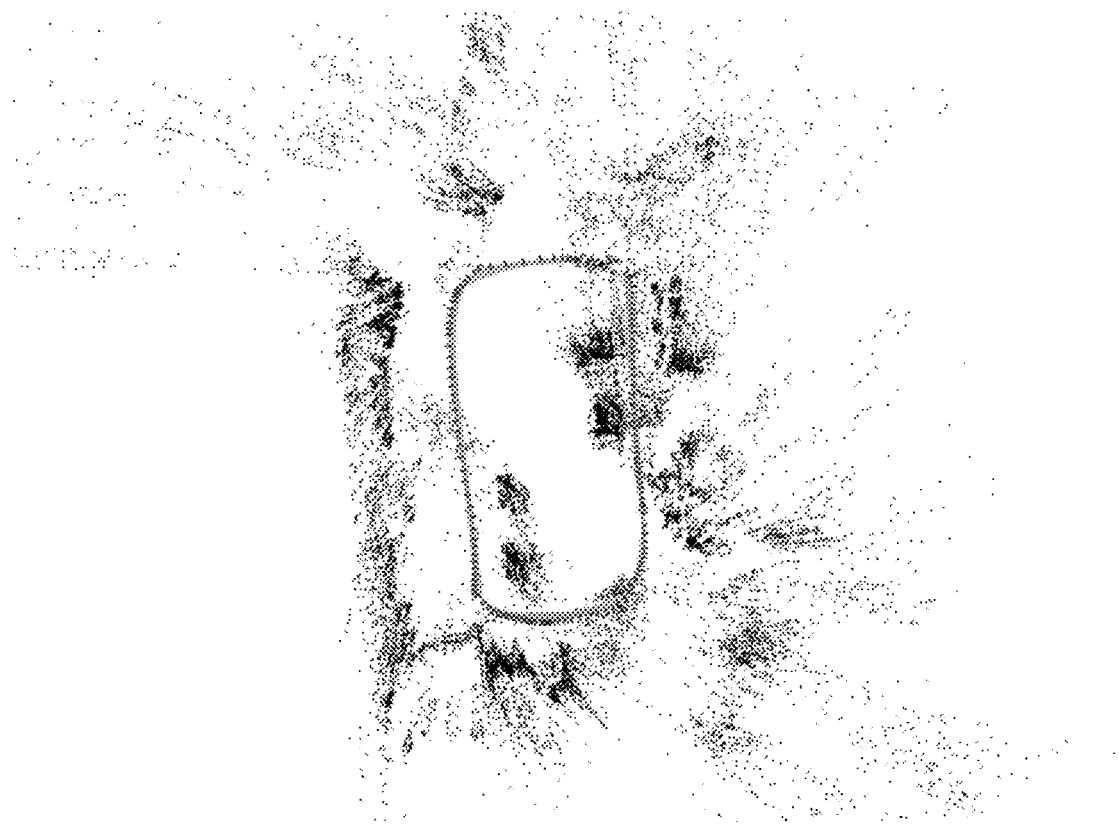
FIG. 2 schematically depicts a visual sparse map according to certain embodiments of the present disclosure.

In certain aspects, the present disclosure relates to an autonomous navigation system using a sparse map. The sparse map can be represented as features (e.g. visual feature descriptors). As each visual feature can be generated from corners or blobs in the image, the number of visual feature points is much smaller than points of the point cloud map. FIG. 1 schematically depicts a system for autonomous navigation using visual sparse map according to certain embodiments of the present disclosure. As shown in FIG. 1, the autonomous navigation system 100 using visual sparse map includes two steps; 1) map generation shown by the top portion of FIG. 1; and 2) autonomous navigation shown by the bottom portion of FIG. 1 (using the map from the top portion). In the map generation step, color images and depth images from an RBG-D camera are used to generate a visual sparse map by Simultaneous Localization and Mapping (SLAM). FIG. 2 shows a visual sparse map according to certain embodiments of the present disclosure. As the visual sparse map includes only visual feature points and keyframes, the map size can be reduced considerably. Each visual feature point has the 3D position of the visual feature point. Each keyframe has 3D position and 3D orientation. In the autonomous navigation step, only color images are used for localization. A SLAM algorithm computes the robot pose using a color image and the visual sparse map. Using the robot pose and keyframes in the visual sparse map, the waypoint follower computes a translation velocity and an angular velocity to drive the robot following the reference line, a list of keyframes in the map.

As shown in FIG. 1, SLAM is used for both generating the sparse map and localization of the robotic device. In certain embodiments, ORB-SLAM2 is revised for building a visual sparse map and localization. ORB-SLAM2 is incorporated herein by reference in its entirety. ORB-SLAM2 includes three modules: 1) Tracking, 2) Local mapping, and 3) Loop closing. The complete autonomous navigation is described by the steps of mapping, localization, and waypoint following. In the step of mapping, a visual sparse map is prepared. In the step of localization, the current robot pose is calculated based on the current image and the visual sparse map. In the step of waypoint following, the robotic device is controlled to drive from the current pose to the next waypoint.

Mapping:

Mapping is performed using multiple images. When a new image is captured, the tracking module checks if a local map is available. If there is no map available, a local map is initialized. The local map is initialized by computing the relative pose between two images in order to triangulate an initial set of map points. If the local map is available, the tracking module predicts a relative pose between the new image and the local map using the motion model. If the motion model is not available, the relative pose is predicted using visual odometry with respect to the last keyframe. If neither motion model nor visual odometry predicts the relative pose, relocalization predicts the relative pose. Relocation finds similar keyframes using visual vocabulary in the map and predicts the relative pose to the most similar keyframe. When the relative pose is successfully predicted by motion model, visual odometry or relocalization, the relative pose is further refined with the local map. After the relative pose of the new image is successfully computed, the tracking module determines if the new image is a new keyframe. If the number of matched points between the current image and the last keyframe is smaller than a threshold, the new image is determined as the new keyframe.

If a new keyframe is generated by the tracking module, the new keyframe is added to the local map. Given the new keyframe, the local map module optimizes the local map using a local Bundle Adjustment (BA). To limit the size of the local map, the local map module checks if there are old keyframes in the local map. If the number of keyframes in the local map is larger than a threshold, one of the oldest keyframe is eliminated from the local map but is kept in a map database.

Given the new keyframe, the loop closing module checks if the new keyframe is a revisited image. The loop closing module recognizes the revisited place using a place recognition database consisting of visual vocabulary. If the new keyframe is found in the visual vocabulary, the loop closing module optimizes the entire map using pose graph optimization and global BA. Otherwise, the visual vocabulary of the new keyframe is added to a place recognition database.

In certain embodiments, the present disclosure further includes a method for saving and loading the map into a file, which method is not included in ORB-SLAM2. The method stores visual feature points, keyframes and a pose graph as components of the visual sparse map. Each visual feature point has the index and 3D position in the map. Each keyframe has the index, 3D pose and visual feature descriptors. The pose graph represents connection information among keyframes using vertices and edges. In the pose graph, vertices represent keyframes and edges represent visible connection among keyframes.

Localization:

Given the map, only the tracking module is used for localization. The local map and the map database is not updated in the localization mode. In addition, the place recognition database is not updated. Whenever a new image is captured, the tracking module computes the relative pose of the camera with respect to the origin of the map. The camera pose $X_C$ is composed of the camera position $\{x, y, z\}$ and orientation $\{roll, pitch, yaw\}$ in the map. The coordinate of the map locates at the pose of the first keyframe in the map.

Waypoint Follower:

Using the camera pose and a reference line from the visual sparse map, the waypoint follower module computes the translation velocity and the angular velocity to control the robot. We assume $X_C$ is identical to the robot pose $X_R$ because the reference line is generated with assuming $X_C$ is identical to the robot pose $X_R$ (or the relationship between $X_C$ and $X_R$ is determined based on the extrinsic parameters of the camera). In other words, the relative transformation matrix between $X_C$ and $X_R$ is an identical matrix. When the new image is captured, $X_R$ is computed by the tracking module of the SLAM module.

The reference line is generated from the map. The reference line is represented as the list of the keyframe positions:

$$L_R = \{X_0, X_1, \ldots, X_{k-1}, X_k\}$$

where $X_K = \{x, y, z\}$ is the $k^{th}$ keyframe position in the map.

If $X_R$ is successfully computed by the tracking module, the nearest keyframe $X_N$ from $X_R$ is founded in $L_R$. A keyframe ahead with a pre-defined distance from $X_N$ is determined as a temporary target waypoint $X_T$. Transitional difference $\delta_T$ and angular difference $\delta_\theta$ between $X_R$ and $X_T$ can be computed by:

$$t_D = \|t_T - t_R\|$$

$$\theta_D = |\theta_T - \theta_R|$$

where $t = \{x, y, z\}$ and $\theta$ is the orientation of the robot in 2D space.

To control the robot, we computes the translational velocity $V_T$ and the rotational velocity $V_\theta$ by:

$$V_T = \begin{cases} V_m & \text{if } \theta_D \leq \theta_h \\ \dfrac{V_m}{2} & \text{otherwise} \end{cases}$$

$$V_\theta = \frac{\theta_D}{\alpha}$$

where $V_m$ is the desired maximum translational speed of the robot. $\theta_h$ is a threshold of angular difference for reducing $V_T$. If $\theta_D$ is larger than $\theta_h$, $V_T$ is reduced by half. $\alpha$ is an empirical coefficient for computing $V_\theta$ using $\theta_D$.

IMPLEMENTATION OF THE DISCLOSURE

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 3:
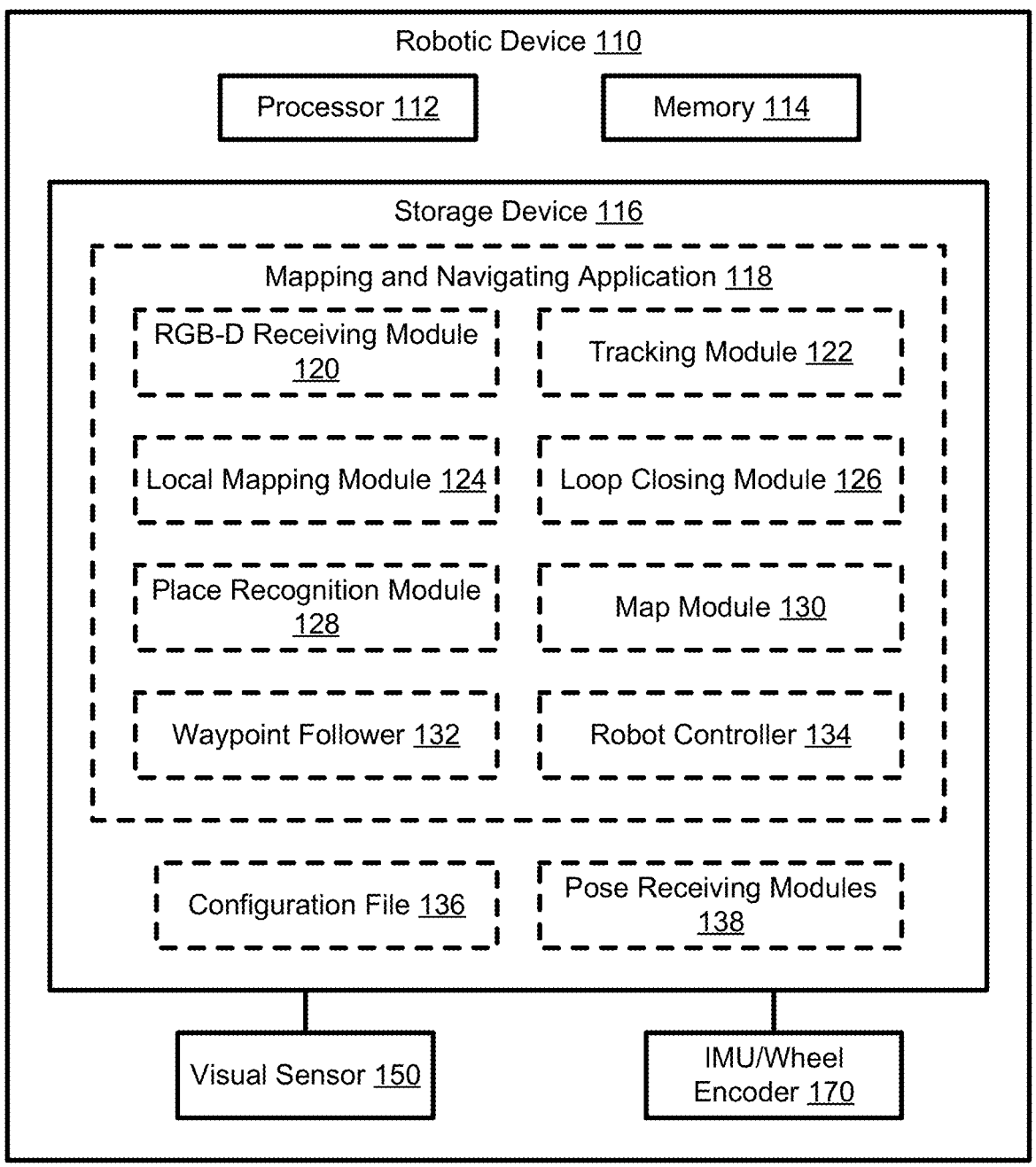
FIG. 3 schematically depicts a system for autonomous navigation using a visual sparse map according to certain embodiments of the present disclosure.

FIG. 3 schematically depicts a system for autonomous navigation using visual sparse map according to certain embodiments of the present disclosure. As shown in FIG. 3, the system 100 includes a robotic device 110. The robotic device 110 may be a ground robotic device, an augmented reality/virtual reality (AR/VR) device, a 3D reconstruction device, an unmanned aerial vehicle (UAV), or a computing device, etc. The robotic device 110 may include, without being limited to, a processor 112, a memory 114, a storage device 116, a visual sensor 150, and inertial measurement unit (IMU)/wheel encoder 170. In certain embodiments, the robotic device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices. The robotic device 110 may further include an interface, which is configured to connect the robotic device 110 to other robotic devices or servers. The interface may be a wireless or wired network, a USB interface, or any other types of interfaces for communication.

In certain embodiments, the visual sensor 150 includes a camera or other visual sensors, and is configured to capture images or videos of the environment. In certain embodiments, the visual sensor 150 is an RGB-D camera or an RGB camera. In other embodiments, the visual sensor 150 may also include light detection and ranging (LIDAR) device, gray scale cameras, etc. The IMU/Wheel encoder 170 may include one or more IMUs, or one or more wheel encoders, or both the IMU and the wheel encoders. The IMUs are inertial sensors, such as accelerometers, gyroscopes and magnetometers, which are configured to perform inertial measurement of the robotic device 110; the wheel encoder is configured to measure distance traveled by the robotic device 110.

The processor 112 controls operation of the robotic device 110. In certain embodiments, the processor 112 may be a central processing unit (CPU). The memory 114 may be a volatile memory, such as the random-access memory (RAM), for storing the data and information during the operation of the robotic device 110. In certain embodiments, the memory 114 may be a volatile memory array. In certain embodiments, the robotic device 110 may run on more than one processor 112 and/or more than one memory 114. The storage device 116 is a non-volatile data storage media or device. Examples of the storage device 116 may include flash memory, memory cards, USB drives, or other types of non-volatile storage devices such as hard drives, floppy disks, optical drives, or any other types of data storage devices. In certain embodiments, the robotic device 110 may have more than one storage device 116. In certain embodiments, the robotic device 110 may also include a remote storage device 116.

The storage device 116 stores computer executable code. The computer executable code includes a mapping and navigating application 118, a configuration file 136, one or more pose receiving modules 138, and optionally other applications such as an operating system. The mapping and navigating application 118 includes the code or instructions which, when executed at the processor 112, may perform sparse map generation and autonomous navigation. The configuration file 136 includes parameters of the visual sensor 150. The pose receiving modules 138 are configured to, upon receiving current pose of the mapping and navigating application 118, control the operation of the robotic device 110 based on its current pose in real time.

In certain embodiments, as shown in FIG. 3, the mapping and navigating application 118 includes, among other things, an RGB-D receiving module 120, a tracking module 122, a local mapping module 124, a loop closing module 126, a place recognition module 128, a map module 130, a waypoint follower 132, and a robot controller 134. In certain embodiments, when the visual sensor 150 is an RGB camera or a grayscale camera, the RGB-D receiving module 120 may also be an RGB receiving module or a grayscale image receiving module.

The RGB-D receiving module 120 is configured to receive or retrieve RGB-D images captured by the RGB-D sensor 150. In certain embodiments, the RGB-D receiving module may be further configured to retrieve configuration information of the RGB-D sensor 150, such as intrinsic parameters and/or extrinsic parameters of the RGB-D sensor 150, and use the parameters to pre-process the received RGB-D image. The intrinsic parameters may include camera center, distortion correction, and focus length; and the extrinsic parameters may include mounting position and orientation of the RGB-D camera 150. The RGB-D image includes R, G, B color channels and depth channel, and the RGB-D receiving module 120 may divide the channels, provide color information and depth information for building sparse map, and provide color information for localization of the robotic device 110.

During mapping, RGB-D or RGB images are required. During autonomous navigation, RGB images are sufficient, and the RGB-D receiving module 120 is configured to capture RGB images, or extract RGB images from RGB-D images, and send each of the RGB images to the tracking module 122.

The tracking module 122 is configured to localize the RGB-D camera 150 with every image or frame, and to decide when to insert a new keyframe. Specifically, upon receiving the current RGB-D image from the RGB-D receiving module 120, the tracking module 122 is configured to check if a local map is available. If there is no local map available, the tracking module 122 is configured to initialize a local map. In certain embodiments, the local map is initialized by the tracking module 122. The local map is initialized by computing the relative pose between two images in order to triangulate an initial set of map points. As the local map is part of the map, a map is initialized as the local map is initialized. If a local map is available, the tracking module 122 is configured to predict a relative pose between the new image and the local map. The tracking module 122 is configured to performs the prediction using motion model; if motion model is not available, using visual odometry; and if visual odometry is not available, using relocalization. In certain embodiments, after successful predication, the tracking module 122 is further configured to refine the relative pose of the current image with the local map.

The tracking module 122 is further configured to determine if the new image is a new keyframe. In certain embodiments, if the number of matched points between the current image and the last keyframe is smaller than a threshold, the new image is determined as the new keyframe. When the new image is determined to be a new keyframe, the tracking module 122 is further configured to generate the new keyframe and send the new keyframe to the local mapping module 124. If the tracking module 122 determines that the new image is not a new keyframe, the method continues to receive the next image.

During autonomous navigation, the tracking module 122 is configured to perform localization using the captured RGB image and the prepared visual sparse map. By performing localization, the robot pose is acquired which corresponds to the captured RGB image.

The local mapping module 124 is configured to, upon receiving the new keyframe, insert the new keyframe to the local map, optimize the local map using a local bundle adjustment (BA), and send the new keyframe to the loop closing module 126. In certain embodiments, the local mapping module 124 is further configured to check if there are old keyframes in the local map, and if the number of keyframes in the local map is larger than a threshold, eliminate one or more old keyframes from the local map. In certain embodiments, redundant key frames are deleted in order to maintain a compact local map. In certain embodiments, if a keyframe has 90% of the map points which has been seen in at least other three keyframes, the keyframe is determined as a redundant keyframe and deleted in the local map. In certain embodiments, the number of seen map points may be in a range of 60%-99%. In certain embodiments, the number of seen map points may be in a range of 85-95%. Although the old keyframe is deleted from the local map, it still maintained in the large scale map.

The loop closing module 126 is configured to, upon receiving the new keyframe, check if the new keyframe is the revisited images, and recognize the revisited places using the place recognition database consisting of visual vocabulary. If the new keyframe is found in the visual vocabulary, the loop closing module 126 optimizes the entire map using pose graph optimization and global BA. If no loop closing is detected, the loop closing module 126 sends the visual vocabulary of the new keyframe to the place recognition module 128, and the place recognition module 128 adds the visual vocabulary of the new keyframe to the place recognition database.

The place recognition module 128 is configured to, upon receiving the visual vocabulary of the new keyframe from the loop closing module 126, store the visual vocabulary of the new keyframe to the place recognition database. In certain embodiments, the visual vocabulary is created with ORB (Orientated FAST and Rotated BRIEF) descriptors of images. Recognition database is incrementally updated by visual vocabulary of new keyframes.

The map module 130 is configured to, upon completion of local mapping and loop closing, store or update the optimized map, that is, the visual sparse map. The visual sparse map may contain visual feature points, keyframes, and a pose graph. Each visual feature point has the index and 3D position in the map. Each keyframe has the index, 3D pose and visual feature descriptors. The pose graph represents connection information among keyframes using vertices and edges. In the pose graph, vertices represent keyframes and edges represents visible connection among keyframes.

The waypoint follower 132 is configured to, upon receiving current robot pose from the tracking module 122, look for a nearest keyframe that is the nearest to the robotic device 110, that is, nearest to the current robot pose. Then the waypoint follower 132 is configured to, along the moving direction of the robotic device 110, look for a keyframe ahead of the nearest keyframe, and have a predefined distance to the nearest keyframe. The found keyframe is named target waypoint.

The waypoint follower 132 is further configured to, when the robot pose and the target waypoint are available, calculate a distance between the robotic device 110 and the target waypoint; and calculates an angle between the robot heading and a vector of the robot position and the target waypoint.

Then the waypoint follower 132 is configured to compute transition velocity and rotational velocity of the robotic device 110 based on the calculated distance and angle, and send the computed transition velocity and rotational velocity to the robot controller 134.

The robot controller 134 is configured to, upon receiving the computed transition velocity and rotational velocity, control operation of the robotic device 110, such that the robotic device 110 moves from the current position to the target waypoint.

Figure 4:
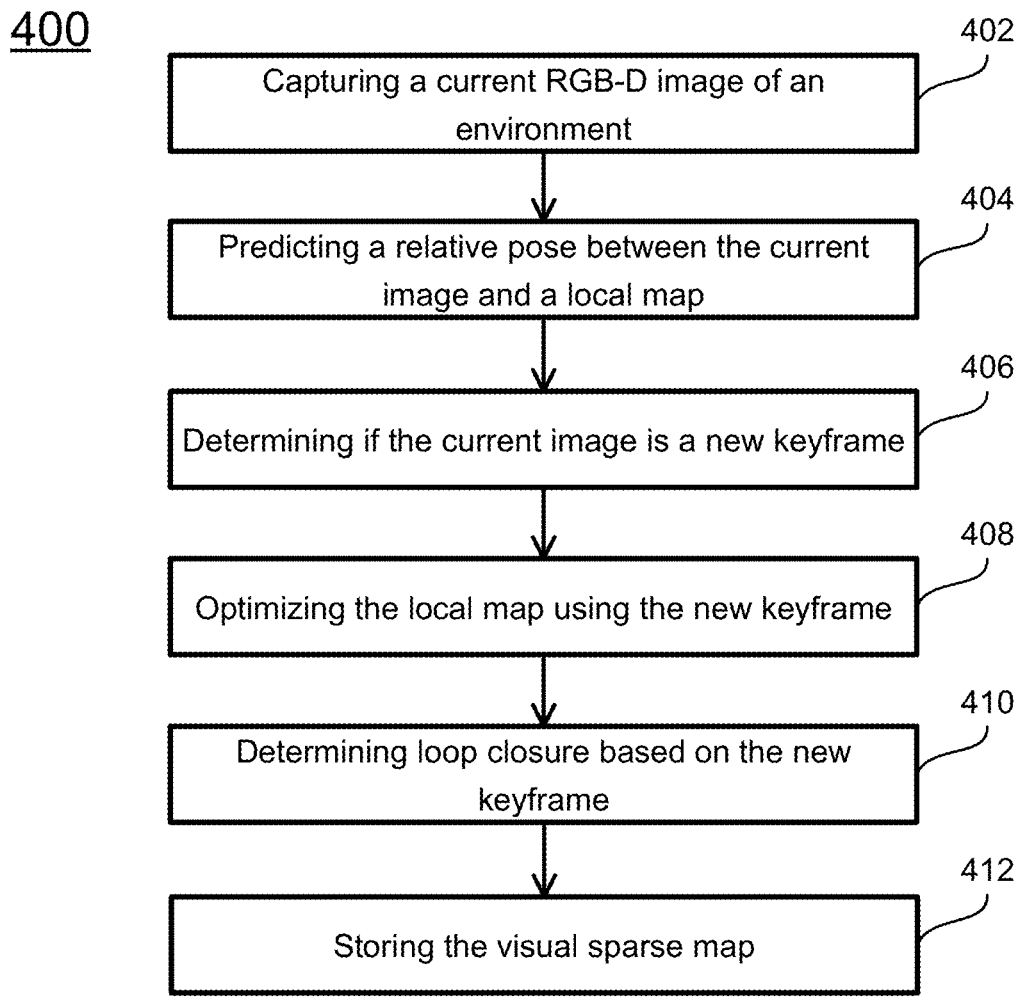
FIG. 4 schematically depicts a method for obtaining a visual sparse map according to certain embodiments of the present disclosure.

FIG. 4 schematically depicts a method for generating a visual sparse map according to certain embodiments of the present disclosure. In certain embodiments, the method 400 as shown in FIG. 4 may be implemented on a robotic device 110 as shown in FIG. 3. It should be particularly noted that, unless otherwise stated in the present disclosure, the steps of the method may be arranged in a different sequential order, and are thus not limited to the sequential order as shown in FIG. 4.

At procedure 402, the RGB-D camera 150 captures RGB-D images (or frames) of the environment, and the RGB-D receiving module 120 receives or retrieves the captured images. After receiving each image, the RGB-D receiving module 120 processes the current image and obtains RGB data and depth data (or RGB-D image), and sends the RGB data and depth data to the tracking module.

At procedure 404, in response to receiving the current RGB-D image, the tracking module 122 checks if a local map is available. If there is no local map available, a local map is initialized. If a local map is available, the tracking module 122 predicts a relative pose between the new image and the local map. The tracking module 122 may performs the prediction using motion model, visual odometry, or relocalization. After successful predication, the tracking module 122 may further refine the relative pose with the local map.

At procedure 406, upon completion of the pose prediction, the tracking module 122 determines if the new image is a new keyframe. In certain embodiments, if the number of matched points between the current image and the last keyframe is smaller than a threshold, the new image is determined as the new keyframe. When the new image is determined to be a new keyframe, the tracking module 122 generates the new keyframe and sends the new keyframe to the local mapping module 124 and the loop closing module 126. If the tracking module 122 determines that the new image is not a new keyframe, the method continues to receive the next image.

At procedure 408, in response to receiving the new keyframe, the local mapping module 124 inserts the new keyframe to the local map, optimizes the local map using a local bundle adjustment (BA), and sends the new keyframe to the loop closing module 126. In certain embodiments, the local mapping module 124 further checks if there are old keyframes in the local map, and if the number of keyframes in the local map is larger than a threshold, eliminate one or more old keyframes from the local map. Although the old keyframe is deleted from the local map, it still maintained in the large scale map.

At procedure 410, in response to receiving the new keyframe, the loop closing module 126 checks if the new keyframe is the revisited images, and recognizes the revisited places using the place recognition database consisting of visual vocabulary. If the new keyframe is found in the visual vocabulary, the loop closing module 126 optimizes the entire map using pose graph optimization and global BA. If no loop closing is detected, the loop closing module 126 sends the visual vocabulary of the new keyframe to the place recognition module 128, and the place recognition module 128 adds the visual vocabulary of the new keyframe to the place recognition database.

At procedure 412, upon completion of local mapping and loop closing, the map module 130 stores or updates the optimized map as the visual sparse map. The map contains visual feature points, keyframes, and a pose graph. Each visual feature point has the index and 3D position in the map. Each keyframe has the index, 3D pose and visual feature descriptors. The pose graph represents connection information among keyframes using vertices and edges. In the pose graph, vertices represent keyframes and edges represents visible connection among keyframes.

The procedures 402-414 describes mapping of the environment under the mapping mode of the robotic device 110. In certain embodiments, the mapping is divided into three threads of tracking, local mapping and loop closing. After the steps 402-414 are performed and the visual sparse map 130 is available, the method can further perform localization of the robotic device 110 under localization mode. In certain embodiments, under the localization mode, the place recognition database 128, the local map, and the large scale map 130 are not updated. Whenever a new image is captured, the tracking module 122 computes the relative pose of the camera with respect to the origin of the map.

Figure 5:
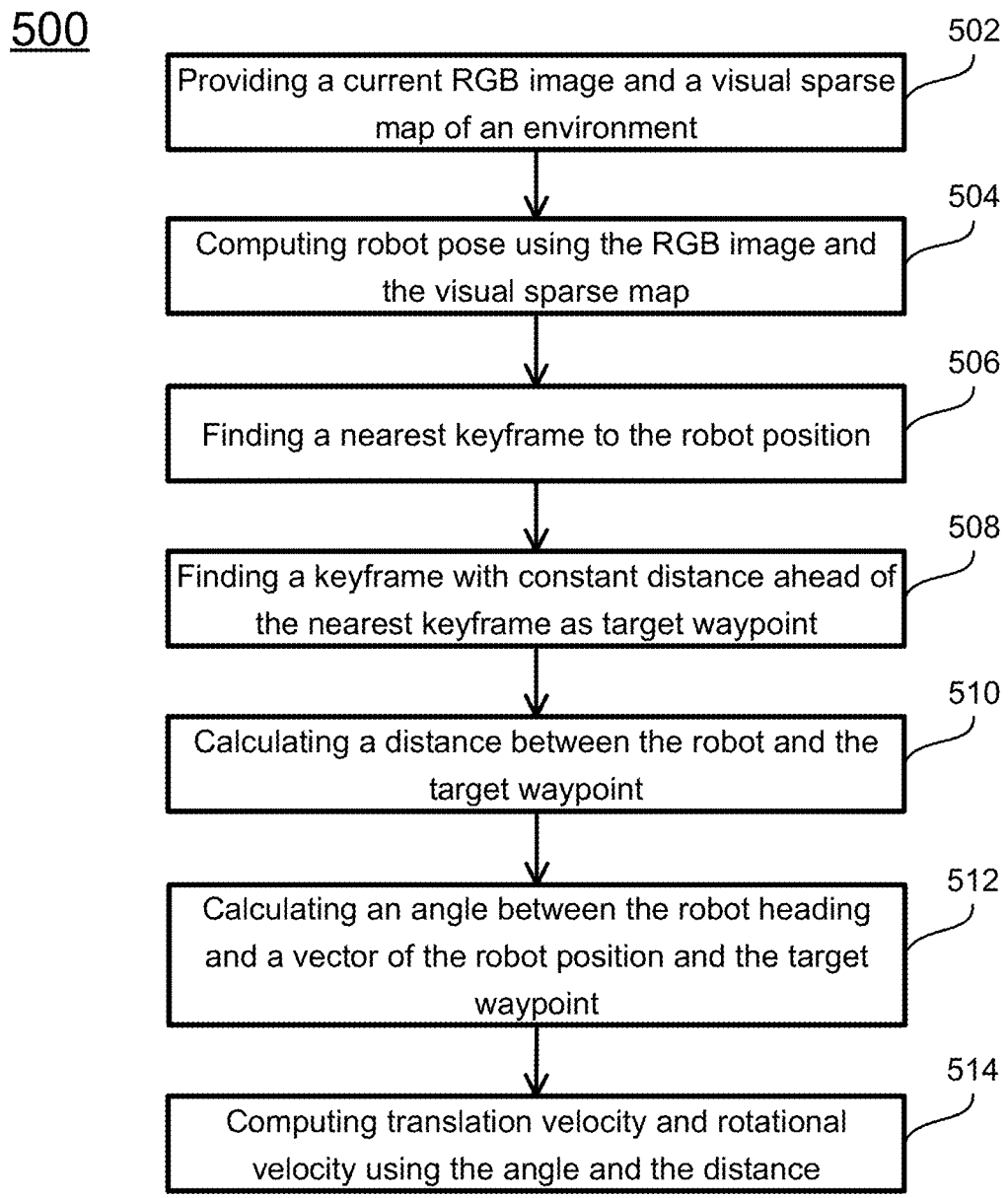
FIG. 5 schematically depicts a method for autonomous navigation using a visual sparse map according to certain embodiments of the present disclosure.

After the visual sparse map 130 is generated and updated, the visual sparse map 130 can be used for navigation as shown in FIG. 5.

FIG. 5 schematically depicts a method for autonomous navigation using visual sparse map according to certain embodiments of the present disclosure. In certain embodiments, the method 500 as shown in FIG. 5 may be implemented on a robotic device 110 as shown in FIG. 3. It should be particularly noted that, unless otherwise stated in the present disclosure, the steps of the method may be arranged in a different sequential order, and are thus not limited to the sequential order as shown in FIG. 5.

In certain embodiments, the method may include an activation procedure, which activate the robotic device from mapping mode to localization mode. Under mapping mode, the tracking module 122, the local mapping module 124 and the loop closure module 126 receive RGB-D image and provide reference line (keyframes) and visual sparse map;

and under localization mode, the tracking module 122 receives RGB or RGB-D image and provides localized robot pose.

At procedure 502, the RGB-D receiving module 120 receives a current RGB image captured by the visual sensor 150 (or extract the RGB image from a captured RGB-D image), and sends the RGB image to the tracking module 122. The RGB-D image may have R, G, B and dept as different channels, and this procedure only uses the color channels R, G, and B.

At procedure 504, in response to receiving the RGB image, the tracking module 122 performs localization, and acquires the robot pose based on the RGB image and the prepared visual sparse map. The robot pose may be represented by the camera pose $X_C$, which includes position {x, y, z} and orientation {roll, pitch, yaw} of the camera in the map.

At procedure 506, after the robot pose is acquired, the waypoint follower 132 looks for a keyframe that is nearest to the camera position.

Then, at procedure 508, the waypoint follower 132 looks for a keyframe ahead of the nearest keyframe, and has a pre-defined distance (has a distance closest to the predetermined distance) to the nearest keyframe. The found keyframe is named target waypoint.

In response to obtaining the robot position and the target waypoint, the waypoint follower 132, at procedure 510, calculates a distance between the robot and the target waypoint; and at procedure 512, calculates an angle between the robot heading and a vector of the robot position and the target waypoint. The robot heading is {yaw} of robot orientation, and the vector is from the robot position to the target waypoint.

At procedure 514, based on the calculated distance and angle, the waypoint follower 132 computes transition velocity and rotational velocity of the robot, and sends the computed transition velocity and rotational velocity to the robot controller 142.

Upon receiving the computed transition velocity and rotational velocity, the robot controller 142 controls operation of the robotic device 110, such that the robotic device 110 moves from the current position to the target waypoint.

In a further aspect, the present disclosure is related to a non-transitory computer readable medium storing computer executable code. The code, when executed at a processer 112 of the robotic device 110, may perform the methods 400 and 500 as described above. In certain embodiments, the non-transitory computer readable medium may include, but not limited to, any physical or virtual storage media. In certain embodiments, the non-transitory computer readable medium may be implemented as the storage device 116 of the robotic device 110 as shown in FIG. 3.

EXAMPLES OF THE DISCLOSURE

The autonomous navigation system according to certain embodiments of the disclosure is evaluated using Robotis Turtlebot 2 with Orbbec Astra Pro in indoor environment and Clearpath Husky with Logitech C920 Pro in outdoor environment.

A. System

Figure 6:
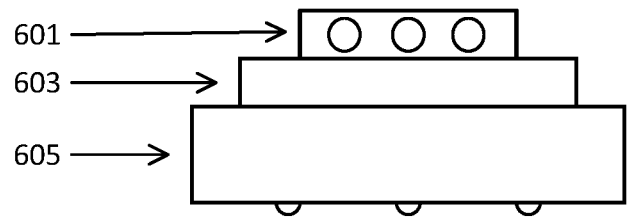
FIG. 6 schematically depicts an exemplary autonomous navigation system according to certain embodiments of the present disclosure.

FIG. 6 schematically depicts an exemplary autonomous navigation system according to certain embodiments of the present disclosure. The system is suitable for indoor environment. As shown in FIG. 6, the system 600 includes an RGB-D camera 601 (Orbbec Astra Pro), a laptop 603 and a robotic device 605 (Turtlebot). The RGB-D camera 601 is installed on the robotic device 605, and has a resolution of 640×480 pixels in both color images and depth images. The laptop 603 is placed between the RGB-D camera 601 and the robotic device 605. The autonomous navigation in the outdoor platform 600 is built on Robot Operating System (ROS).

Figure 7:
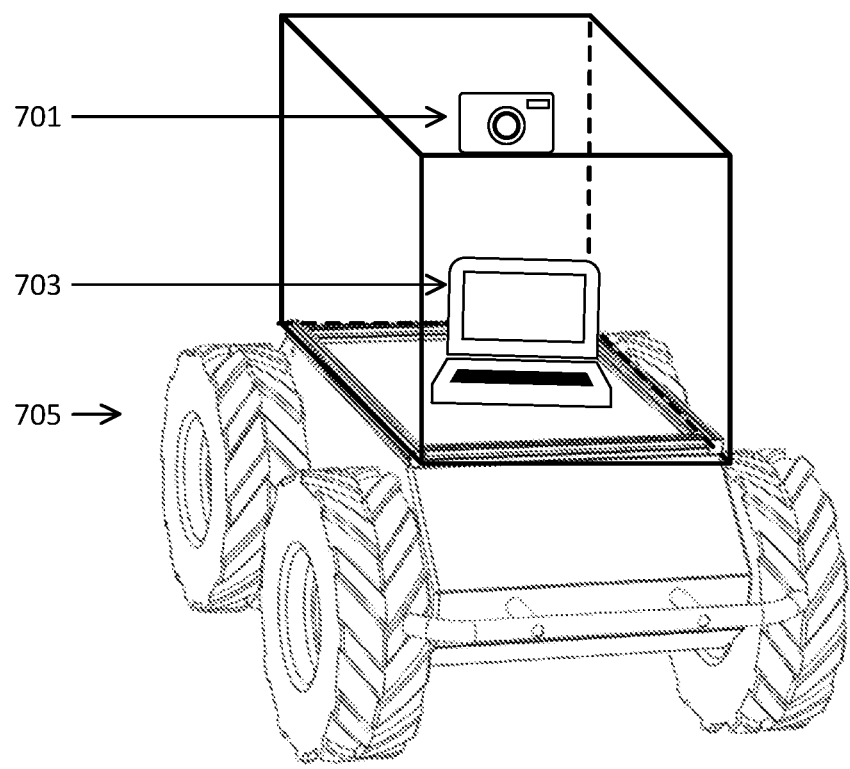
FIG. 7 schematically depicts an exemplary autonomous navigation system according to certain embodiments of the present disclosure.

FIG. 7 schematically depicts an exemplary autonomous navigation system according to certain embodiments of the present disclosure. The system is suitable for outdoor environment. Because RGB-D camera may not work in outdoor environment, an RGB camera is used for both mapping and localization in outdoor environment. As shown in FIG. 7, the system 700 includes an RGB camera 701 (Logitech C920 Pro), a laptop 703, and a robotic device 705 (Clearpath Husky). The RGB camera 701 is used with only 640×480 color images for both mapping and localization. Both the RGB camera 701 and the laptop 703 are installed on the robotic device 705. The autonomous navigation in the outdoor platform 700 is built on ROS.

B. Localization Accuracy with Map Data

Localization accuracy with map data are evaluated before evaluating autonomous navigation. The same map data are used for evaluating localization accuracy. However, only color images are used for localization while both color images and depth images are used for building a map in indoor environment.

An office environment is provided for data collection. The office environmnet includes an Office A, a hallway, an elevator at the hallway, a glass door to an Office B, a narrow gate to the Office B, and the Office B. A total of three datasets in the office environment are collected. The first dataset is collected in the office A which includes desks, chairs and shelves. A robot starts near a first shelf and returns to the start position. The second dataset is collected in the Office A and the hallway. The robot starts from the Office A, runs along the hallway and stops in front of the elevator at the end of the hallway. The third dataset is collected in the Office A, the hallway and the Office B. The robot starts from the Office A, runs along the hallway and stops at the Office B. There is an one meter-wide narrow gate between the hallway and Office B. Table 1 shows the path length and environment of each dataset.

TABLE 1

Datasets in indoor environment.

| Dataset | Length (m) | Environment |
| --- | --- | --- |
| I | 17.41 | Office A |
| II | 41.38 | Office A, hallway |
| III | 49.40 | Offices A and B, hallway |

Figure 8B:
FIG. 8A and FIG. 8B respectively show maps and trajectories of dataset II and III.
Figure 8A:

FIG. 8A and FIG. 8B respectively show maps and trajectories of dataset II and III. The map and trajectory of dataset I is shown in FIG. 2. Table 2 shows the localization error with map datasets.

Figure 9:
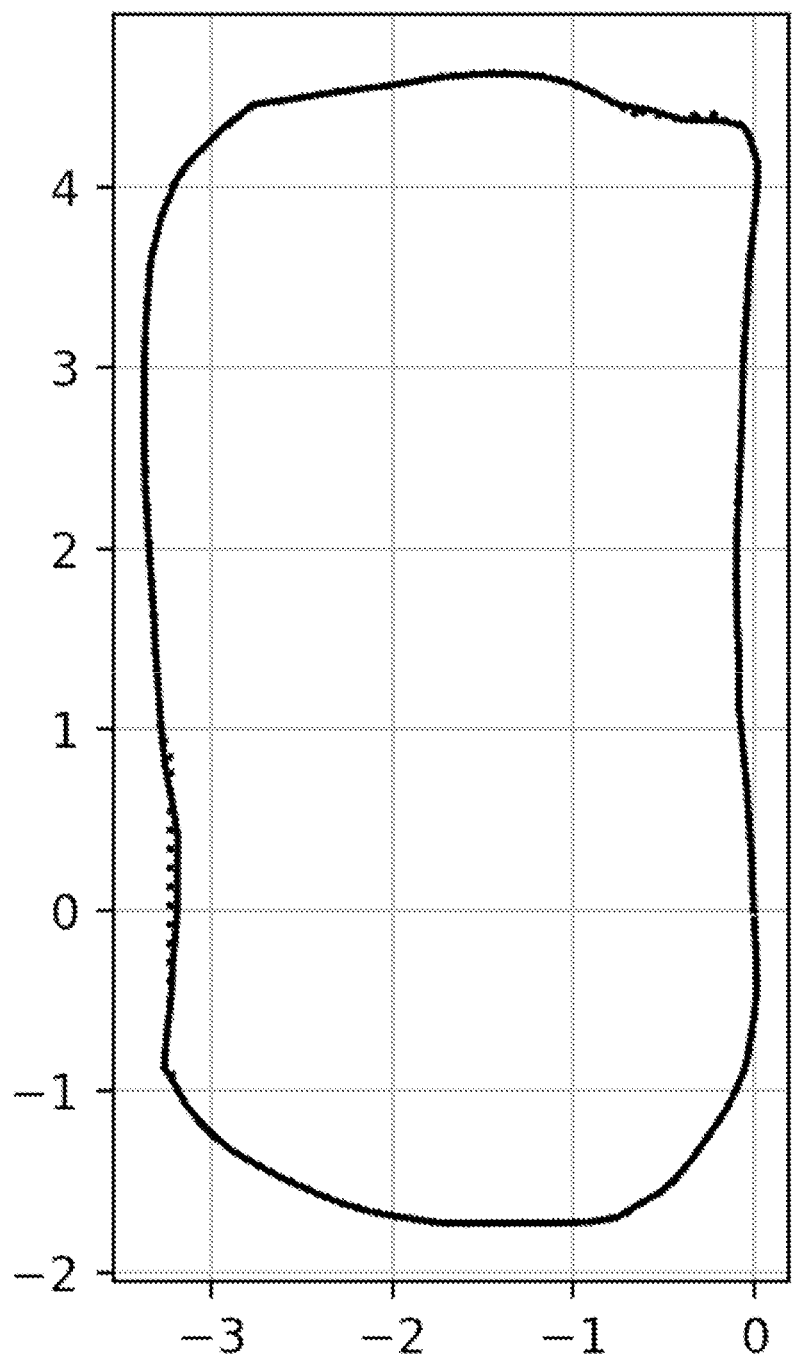
FIG. 9 shows map and localization trajectories of dataset I.

Although the same map dataset is used for evaluating localization accuracy, the average Root Mean Square Error (RMSE) is 0.031 meter because ORB-SLAM2 randomly generates visual features from a color image for localization. However, the average RMSE is acceptable for autonomous navigation because the minimum width of path is one meter. FIG. 9 shows map and localization trajectories on dataset I, where a black line represents a reference line (i.e. map) and a dotted line represents localization. As RMSE is 0.036 meter, the localization trajectory substantially overlays the map trajectory.

TABLE 2

Localization RMSE with map data.

| Dataset | RMSE (m) |
|---|---|
| I | 0.036 |
| II | 0.030 |
| III | 0.030 |
| Average | 0.031 |

Localization accuracy in environment changes are also evaluated because the environment can be changed after generating the map. About 30% of objects in the same place in dataset I are changed, and a new dataset is collected for evaluating localization. Given the map generated from dataset I, localization RMSE is 0.116±0.111 meter (mean±standard deviation). Although environment changes increase localization RMSE slightly, the RMSE in environment changes is still acceptable for autonomous navigation.

C. Localization Accuracy in Autonomous Navigation

Localization error when the robot ran in the autonomous navigation step is evaluated. The waypoint follower drives the robot to follow a reference line as close as possible. The localization error is computed by finding the closest waypoint from the estimated position by ORB-SLAM2 localization as shown in Table 3.

TABLE 3

Localization RMSE in autonomous navigation.

| Dataset | RMSE (m) |
|---|---|
| I | 0.065 ± 0.045 |
| II | 0.166 ± 0.127 |
| III | 0.117 ± 0.075 |
| Average | 0.116 ± 0.082 |

Figure 10C:
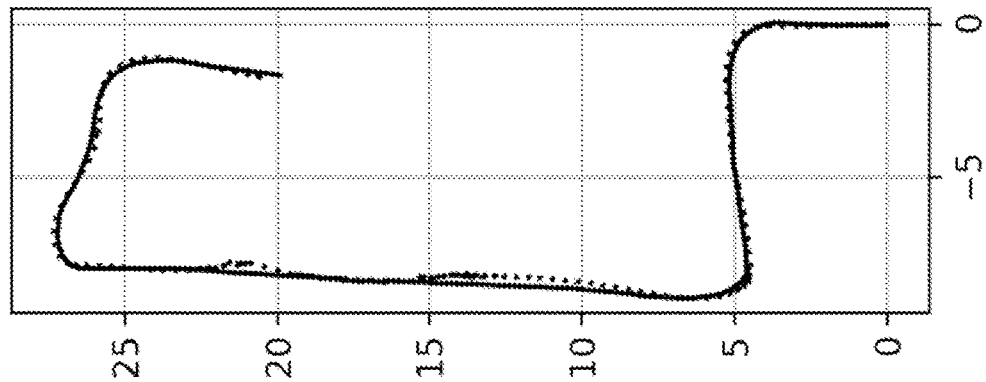
FIGS. 10A-10C show map and localization trajectories in autonomous navigation respectively of dataset I, II and III.
Figure 10B:
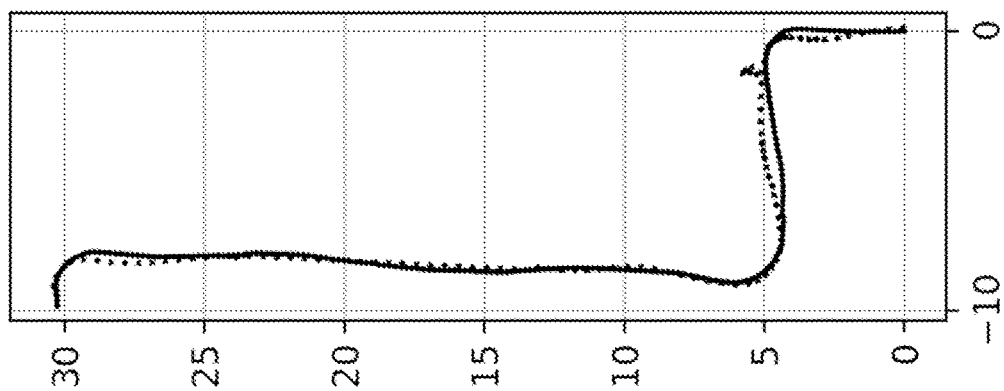
Figure 10A:
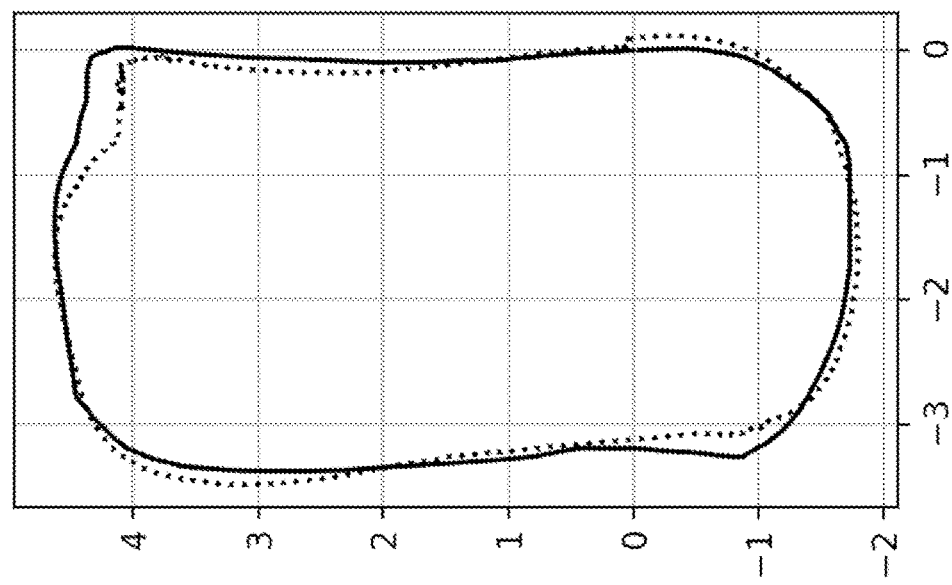
Figure 11A:
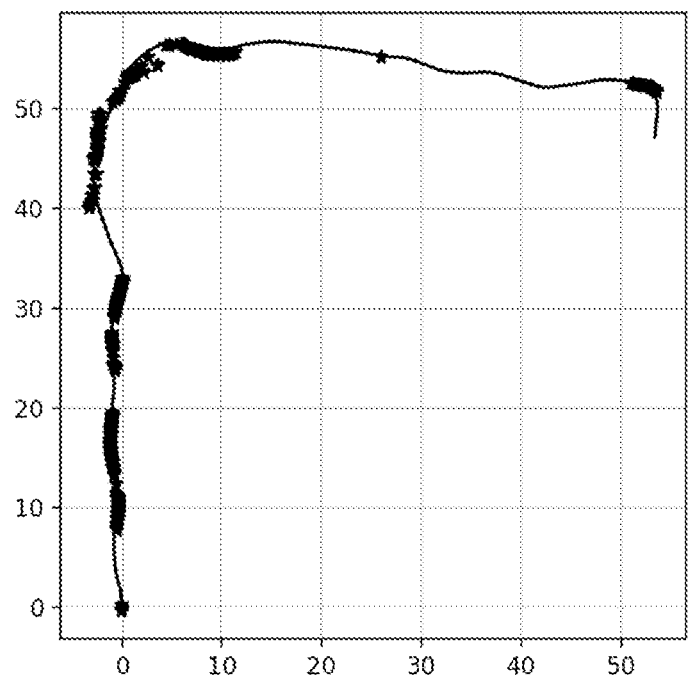
FIGS. 11A-11D respectively show trajectories of map and localization of dataset IV, VI, VIII and IX.
Figure 11B:
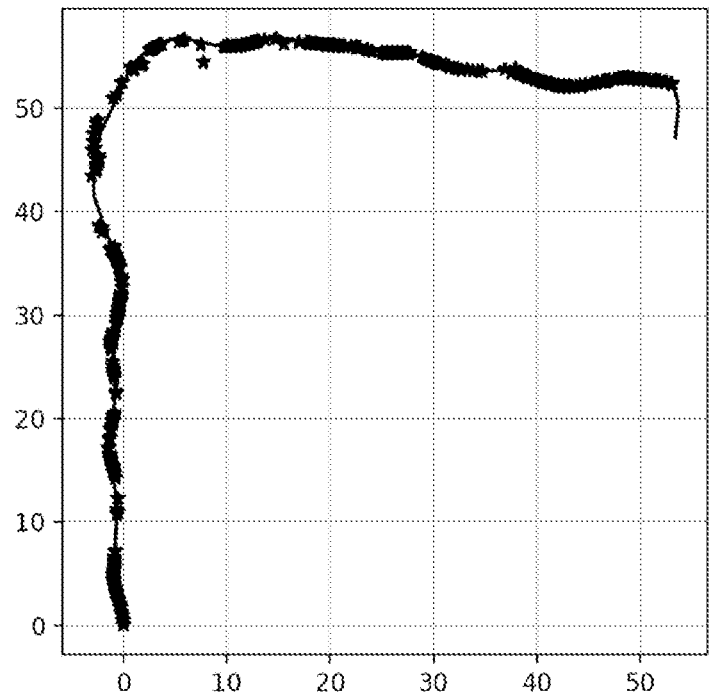
Figure 11C:
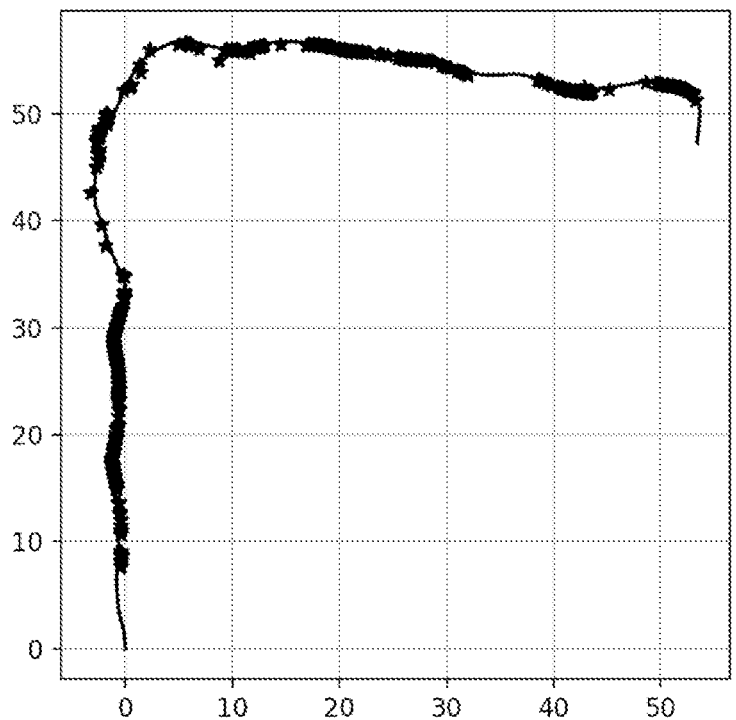
Figure 11D:
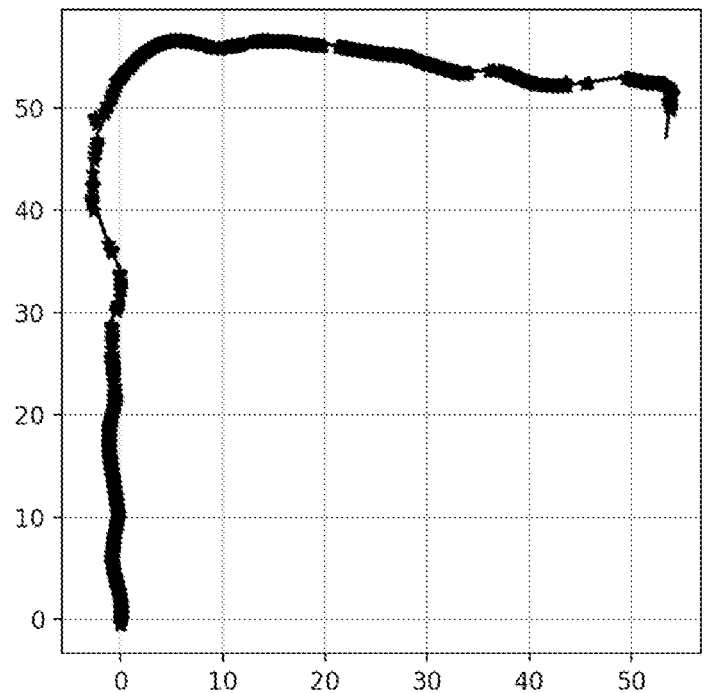

Experimental results show that: 1) the average localization RMSE is 0.116±0.082 meter (mean±standard deviation); 2) the robot ran successfully navigates in three different environments even there are challenge environments such as feature-spare long hallway (length: 25 meter) and one meter wide narrow gate; 3) there are relatively larger error when the robot turns; 4) feature sparse long hallway increases localization error. FIGS. 10A-10C show map and localization trajectories in autonomous navigation respectively for dataset I, II and III, where a black line represents a reference line (i.e. map) and a dotted line represents localization.

D. Environment Changes in Outdoor Environment

Localization error is evaluated with environment changes in outdoor environment. Datasets are collected along the sidewalk around JD.com office, Santa Clara, Calif., USA. The path consists of straight, curved and winding sidewalks under trees. The map dataset is collected at 15:04 on Dec. 13, 2017. The path length of the map is 114.70 meter. Six collected datasets are shown in Table 4. 1) dataset IV to VII are collected at different time in sunny days; 2) dataset VIII is collected in a cloudy day; dataset IX is collected in a rainy day.

TABLE 4

Localization analysis with environment changes in outdoor environment.

| | | | Failure | Failure time (sec) | | |
|---|---|---|---|---|---|---|
| Dataset | Weather | Date/Time | ratio | Max | Mean | Std. |
| IV | Sunny | 2018-01-19-09-57-51 | 48% | 36.15 | 1.55 | 4.29 |
| V | Sunny | 2018-01-11-14-12-09 | 10% | 0.57 | 0.22 | 0.13 |
| VI | Sunny | 2018-01-12-15-32-45 | 3% | 0.33 | 0.07 | 0.06 |
| VII | Sunny | 2018-01-12-16-51-56 | 12% | 2.40 | 0.44 | 0.52 |
| VIII | Cloudy | 2018-01-17-11-39-49 | 17% | 3.43 | 0.99 | 1.30 |
| IX | Rainy | 2018-01-03-11-40-42 | 12% | 9.80 | 0.55 | 1.30 |

Two metric, failure ratio and failure time are used for evaluating localization performance. Failure ratio is the ratio of localization failure over all localization tries. Failure time is the time from the localization failure to the next localization success. As the dataset is collected by manual driving, localization accuracy is not evaluated.

As shown in Table 4, experimental results show that: 1) dataset VI has the smallest failure ratio because dataset VI is collected at similar time and weather to the map; 2) dataset IV has the largest failure ratio because the illumination of dataset IV is quite different from the map due to the position of the sun; 3) failure time has proportional relationship with failure ratio in sunny day but the proportional relationship between failure ratio and failure time is not valid in the rainy day and the cloudy day; 4) in the rainy day, failure time is larger than the cloudy day while failure ratio is smaller than the cloudy day. FIGS. 11A-11D respectively show trajectories of map and localization in dataset IV, VI, VIII and IX, where a black line represents a reference line (i.e. map) and start dots represent localization.

E. Autonomous Navigation in Outdoor Environment

As mentioned in the previous section, ORB-SLAM2 is not robust at different time and different weather in outdoor environment. Thus, we evaluated autonomous navigation at 15:02 on Jan. 11, 2018, a sunny day, which is similar time and weather to the map.

Figure 12:
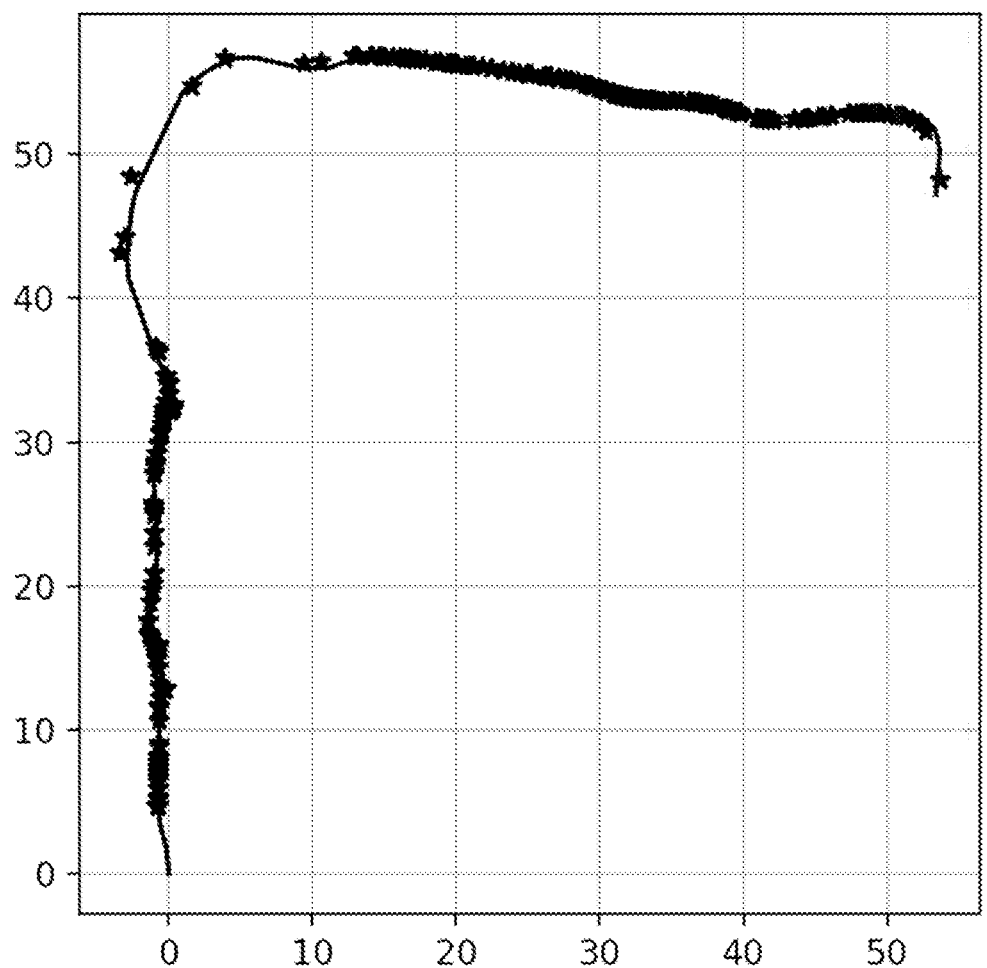
FIG. 12 shows trajectories of map and localization in autonomous navigation according to certain embodiments of the present disclosure.

Experimental result shows the robot ran successfully on the sidewalk and localization RMSE is 0.246±0.151 meter (mean±standard deviation). The width of sidewalk is about 1.5 meter. FIG. 12 shows trajectories of map and localization in autonomous navigation. We note that the robot is rarely localized in the curved sidewalk because most visual features come from the distant objects.

In summary, autonomous navigation system using only visual sparse map for indoor environment and outdoor environment are provided according to certain embodiments of the present disclosure. ORB-SLAM2 is used for mapping and localization. Waypoint follower drives the robot to follow the reference line. The provided system in indoor environment and outdoor environment using two robot platforms are evaluated. Experimental results show that: 1) localization errors with the map datasets are small enough for the robot to run autonomously indoor environment; 2) the robot successfully ran in three indoor environments including environment changes; 3) environment changes in outdoor apparently increases localization failure ratios; 4) the robot successfully ran in similar time and weather to the map in outdoor environment. The experimental video is available at https://drive.google.com/file/d/1DlDa6lkrQA6Zi2XAbKn0hZsR8cXLyXKO/view?usp=sharing, which is incorporated herein by reference in its entirety.

In certain embodiments, robust localization with environment changes in outdoor environment are evaluated. In certain embodiments, sensor fusion with additional sensors such as IMU, GPS and Lidar are evaluated. In certain embodiments, the provided system is extended by including obstacle avoidance and path planning.

According to certain embodiments of the disclosure, among other things, by using the nearest keyframe and the waypoint keyframe, the visual sparse map is efficiently used, and autonomous navigation is achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

[1] R. Siegwart, I. R. Nourbakhsh, D. Scaramuzza, Introduction to Autonomous Mobile Robots, Second edition, The MIT Press, 2011.
[2] J. C. Latombe, Robot Motion Planning, Kluwer Academic Publishers, 1991.
[3] A. Lazanas, J. C. Latombe, Landmark robot navigation, Proceedings of the Tenth National Conference on AI, 1992.
[4] E. Marder-Eppstein, E. Berger, T. Foote, B. Gerkey, and K. Konolige, The office marathon: Robust navigation in an indoor office environment, Proc. IEEE International Conference on Robotics and Automation (ICRA), 2010, pp. 300-307.
[5] K. Konolige, M. Agrawal, R. C. Bolles, C. Cowan, M. Fischler, and B. Gerkey, Outdoor mapping and navigation using stereo vision, Exp. Robot., 2008, pp. 179-190.
[6] F. Dayoub, T. Morris, B. Uperoft, P. Corke, "Vision-only autonomous navigation using topometric maps," Intelligent Robots and Systems (IROS), 2013 IEEE/RSJ International Conference on, 2013, pp. 1923-1929.
[7] J. Engel, T. Schps, D. Cremers, LSD-SLAM: Large-Scale Direct Monocular SLAM, European Conference on Computer Vision (ECCV), 2014.
[8] J. Engel, J. Sturm, D. Cremers, Semi-Dense Visual Odometry for a Monocular Camera, IEEE International Conference on Computer Vision (ICCV), 2013.
[9] S. Hong, 6-DOF Pose Estimation for A Portable Navigation Device, PhD dissertation, University Of Arkansas at Little Rock, 2014.
[10] R. F. Salas-Moreno, R. A. Newcombe, H. Strasdat, P. H. J. Kelly, A. J. Davison, SLAM++: Simultaneous Localisation and Mapping at the Level of Objects, IEEE Conference on Computer Vision and Pattern Recognition (CVPR), 2013, pp. 1352-1359.
[11] R. F. Salas-Moreno, B. Glocken, P. H. J. Kelly, A. J. Davison, Dense planar SLAM, IEEE International Symposium on Mixed and Augmented Reality (IS-MAR), 2014, pp. 157-164.
[12] P. Henry, M. Krainin, E. Herbst, X. Ren, and D. Fox, RGB-D mapping Using Kinect-style depth cameras for dense 3D modeling of indoor environments, International Journal of Robotics Research, 2012, Vol. 31, No. 5, pp. 647-663.
[13] A. S. Huang, A. Bachrach, P. Henry, M. Krainin, D. Mat-urana, D. Fox, N. Roy, Visual odometry and mapping for autonomous flight using an RGB-D camera, International Symposium on Robotics Research (ISRR), 2011, pp. 1-16.
[14] R. A. Newcombe, S. Izadi, O. Hilliges, D. Molyneaux, D. Kim, A. J. Davison, P. Kohi, J. Shotton, S. Hodges, A. Fitzgibbon, KinectFusion: Real-time dense surface mapping and tracking, IEEE International Symposium on Mixed and Augmented Reality (ISMAR), 2011, pp. 127-136.
[15] V. Pradeep, C. Rhemann, S. Izadi, C. Zach, M. Bleyer, S. Bathiche, MonoFusion: Real-time 3D reconstruction of small scenes with a single web camera, 2013 IEEE International Symposium on Mixed and Augmented Reality (ISMAR), 2013, pp. 83-88.
[16] A. J. Davison, I. D. Reid, N. D. Molton, and O. Stasse, MonoSLAM: Real-time single camera SLAM, IEEE Transactions on Pattern Analysis and Machine Intelligence, 2007, Vol. 29, No. 6, pp. 1052-1067.
[17] R. Mur-Artal, J. M. M. Montiel, and J. D. Tardos, ORB-SLAM: a Versatile and Accurate Monocular SLAM system, IEEE Trans. Robot., 2015, pp. 1147-1163.
[18] H. Lim, J. Lim, and H. J. Kim, Real-time 6-DOF monocular visual SLAM in a large-scale environment, 2014 IEEE Inter-national Conference on Robotics and Automation (ICRA), 2014, pp. 1532-1539.
[19] J. Lim, J.-M. Frahm, and M. Pollefeys, Online environment mapping, CVPR 2011, 2011, pp. 3489-3496.
[20] H. Badino, D. Huber, and T. Kanade, Real-time topometric localization, IEEE Int. Conf. Robot. Autom., no. ICRA, 2012, pp. 1635-1642.
[21] C. X. Guo, K. Sartipi, R. C. Dutoit, G. Georgiou, R. Li, J. O. Leary, E. D. Nerurkar, J. A. Hesch, and S. I. Roumeliotis, Large-Scale Cooperative 3D Visual-Inertial Mapping in a Manhattan World, Technical Report, University of Minnesota, Dept. of Comp. Sci. and Eng., MARS Lab, 2015.
[22] R. Mur-Artal, & J. D. Tardos, ORB-SLAM2: An Open-Source SLAM System for Monocular, Stereo, and RGB-D Cameras, IEEE Transactions on Robotics, 2017.
[23] Robotis turtlebot2, http://www.turtlebot.com/turtlebot2/
[24] Orbbec Astra Pro, https://orbbec3d.com/product-astra-pro/
[25] Clearpath Husky, https://www.clearpathrobotics.com/huskyunmanned-ground-vehicle-robot/
[26] Logitech C920 Pro, https://www.logitech.com/en-us/product/hd-prowebcam-c920
[27] Robot Operating System (ROS), http://www.ros.org/
[28] Vicon motion capture system, https://www.vicon.com/

What is claimed is:

1. A system for autonomous navigation using a visual sparse map, comprising a robotic device, wherein the robotic device comprises a visual sensor, a processor and a storage device storing computer executable code, and the computer executable code, when executed at the processor, is configured to:

obtain the visual sparse map, the visual sparse map comprising a plurality of visual feature points and a plurality of keyframes;

capture an image using the visual sensor;

acquire a current pose of the robotic device based on the image and the visual sparse map;

find a nearest keyframe, wherein the nearest keyframe is one of the plurality of keyframes that is nearest to the current pose of the robotic device;

find a target waypoint, wherein the target waypoint is one of the plurality of keyframes that is ahead of the nearest keyframe and has a pre-determined distance to the nearest keyframe;

compute transition velocity and rotation velocity of the robotic device based on relative location between the robotic device and the target waypoint; and control operation of the robotic device using the computed transition velocity and rotation velocity to achieve autonomous navigation, wherein the plurality of keyframes are listed as $\{x_0, x_1, \ldots, x_{k-1}, x_k\}$, $x_k$ is defined by three dimensional coordinates of the $k^{th}$ keyframe, k is an index of $x_k$, and the target waypoint has an index greater than an index of the nearest keyframe.

2. The system of claim 1, wherein the pre-defined distance is in a range of 30 centimeter (cm) to 50 cm.

3. The system of claim 1, wherein the computer executable code is configured to compute the transition velocity and the rotation velocity based on a transition difference and an angular difference between the current pose of the robotic device and the target waypoint, and the transition difference $t_D$ and the angular difference $\theta_D$ are calculated by:

$t_D = \|t_T - t_R\|$, and $\theta_D = |\theta_T - \theta_R|$, wherein $t_T$ is a location of the target waypoint in the visual sparse map, $t_R$ is a location of the robotic device in the visual sparse map, and $t_D$ is the transition difference between the location of the robotic device and the location of the target waypoint; and wherein $\theta_T$ is an orientation of the target waypoint in 2D space of the visual sparse map, $\theta_R$ is an orientation of the robotic device in the 2D space of the visual sparse map, and $\theta_D$ is the angular difference between the orientation of the robotic device and the orientation of the target waypoint.

4. The system of claim 3, wherein the computer executable code is configured to compute the transition velocity $V_T$ and the rotation velocity $V_\theta$ by:

$$V_T = \begin{cases} V_m & \text{if } \theta_D \leq \theta_h \\ \frac{V_m}{2} & \text{if } \theta_D > \theta_h \end{cases}, \text{ and}$$

$$V_\theta = \frac{\theta_D}{\alpha},$$

wherein $V_m$ is a desired maximum translation speed of the robotic device, $\theta_h$ is a threshold of angular difference for reducing $V_T$, and $\alpha$ is an empirical coefficient.

5. The system of claim 4, wherein $\theta_h$ is about 55-60 degrees, and a is in a range of 3-12.

6. The system of claim 1, wherein the visual sensor is an RGB-D camera, the visual sparse map is obtained based on collected RGB-D images by the visual sensor, and the image captured is RGB image.

7. The system of claim 6, wherein the computer executable code is configured to obtain the visual sparse map by:
collecting each of the RGB-D images;
extracting feature points from each of the RGB-D images; and
for each of the RGB-D images:
predicting a relative pose between the current image and a local map based on the extracted feature points and feature points in the local map;
determining if the current image is a new keyframe by comparing the extracted feature points with feature points in a last keyframe;
optimizing the local map using the new keyframe;
determining loop closure based on the new keyframe; and
storing the extracted feature points and the new keyframe to obtain the visual sparse map.

8. The system of claim 7, wherein the step of predicting a relative pose is performed using at least one of motion model, visual odometry, and relocalization.

9. The system of claim 7, wherein the current image is determined to be the new keyframe if a number of matched points between the current image and the last keyframe is smaller than a threshold.

10. The system of claim 7, wherein the computer executable code is configured to delete an old keyframe when a number of keyframes in the local map is greater than a threshold.

11. The system of claim 7, wherein the step of determining loop closure uses a place recognition database consisting of a visual vocabulary.

12. A method for autonomous navigation using a visual sparse map, comprising:
obtaining the visual sparse map, the visual sparse map comprising a plurality of visual feature points and a plurality of keyframes;
capturing an image using the visual sensor;
acquiring, by a processor of the robotic device, a current pose of the robotic device based on the image and the visual sparse map;
finding, by the processor, a nearest keyframe, wherein the nearest keyframe is one of the plurality of keyframes that is nearest to the current pose of the robotic device;
finding, by the processor, a target waypoint, wherein the target waypoint is one of the plurality of keyframes that is ahead of the nearest keyframe and has a pre-determined distance to the nearest keyframe;
computing, by the processor, transition velocity and rotation velocity of the robotic device based on relative location between the robotic device and the target waypoint; and
controlling, by the processor, operation of the robotic device using the computed transition velocity and rotation velocity to achieve autonomous navigation,
wherein the plurality of keyframes are listed as $\{x_0, x_1, \ldots, x_{k-1}, x_k\}$, $x_k$ is defined by three dimensional coordinates of the $k^{th}$ keyframe, k is an index of $x_k$, and the target waypoint has an index greater than an index of the nearest keyframe.

13. The method of claim 12, wherein the pre-defined distance is in a range of 30 cm to 50 cm.

14. The method of claim 12, wherein the step of computing the transition velocity and the rotation velocity is performed based on a transition difference and an angular difference between the current pose of the robotic device and the target waypoint, and the transition difference $t_D$ and the angular difference $\theta_D$ are calculated by:

$t_D = \|t_T - t_R\|$, and $\theta_D = |\theta_T - \theta_R|$, wherein $t_T$ is a location of the target waypoint in the visual sparse map, $t_R$ is a location of the robotic device in the visual sparse map, and $t_D$ is the transition difference between the location of the robotic device and the location of the target waypoint; and wherein $\theta_T$ is an orientation of the target waypoint in 2D space of the visual sparse map, $\theta_R$ is an orientation of the robotic device in the 2D space of the visual sparse map, and $\theta_D$ is the angular difference between the orientation of the robotic device and the orientation of the target waypoint.

15. The method of claim 14, wherein the transition velocity $V_T$ and the rotation velocity $V_\theta$ are computed by:

$$V_T = \begin{cases} V_m & \text{if } \theta_D \leq \theta_h \\ \dfrac{V_m}{2} & \text{if } \theta_D > \theta_h \end{cases}, \text{ and}$$

$$V_\theta = \frac{\theta_D}{\alpha},$$

wherein $V_m$ is a desired maximum translation speed of the robotic device, $\theta_h$ is a threshold of angular difference for reducing $V_T$, and a is an empirical coefficient.

16. The method of claim 15, wherein $\theta_h$ is about 55-60 degrees, a is in a range of 3-12, the visual sensor is an RGB-D camera, the visual sparse map is obtained based on RGB-D images collected by the visual sensor, and the image captured is an RGB image.

17. A non-transitory computer readable medium storing computer executable code, wherein the computer executable code, when executed at a processor of a robotic device, is configured to:

obtain the visual sparse map, the visual sparse map comprising a plurality of visual feature points and a plurality of keyframes;

capture an image using the visual sensor;

acquire a current pose of the robotic device based on the image and the visual sparse map;

find a nearest keyframe, wherein the nearest keyframe is one of the plurality of keyframes that is nearest to the current pose of the robotic device;

find a target waypoint, wherein the target waypoint is one of the plurality of keyframes that is ahead of the nearest keyframe and has a pre-determined distance to the nearest frame;

compute transition velocity and rotation velocity of the robotic device based on relative location between the robotic device and the target waypoint; and control operation of the robotic device using the computed transition velocity and rotation velocity to achieve autonomous navigation, wherein the plurality of keyframes are listed as $\{x_0, x_1, \ldots, x_{k-1}, x_k\}$, $x_k$ is defined by three dimensional coordinates of the $k^{th}$ keyframe, k is an index of $x_k$, and the target waypoint has an index greater than an index of the nearest keyframe.

18. The non-transitory computer readable medium of claim 17, wherein the computer executable code is configured to compute the transition velocity $V_T$ and the rotation velocity $V_\theta$ by:

$$V_T = \begin{cases} V_m & \text{if } \theta_D \leq \theta_h \\ \dfrac{V_m}{2} & \text{if } \theta_D > \theta_h \end{cases}, \text{ and}$$

$$V_\theta = \frac{\theta_D}{\alpha},$$

wherein $V_m$ is a desired maximum translation speed of the robotic device, $\theta_D$ is the angular difference between the orientation of the robotic device and the orientation of the target waypoint, $\theta_h$ is a threshold of angular difference for reducing $V_T$, and a is an empirical coefficient.

19. The non-transitory computer readable medium of claim 17, wherein the pre-defined distance is in a range of 30 cm to 50 cm, $\theta_h$ is about 55-60 degrees, and $\alpha$ is in a range of 3-12.

* * * * *